(12) United States Patent
Cheng et al.

(10) Patent No.: US 12,241,142 B2
(45) Date of Patent: Mar. 4, 2025

(54) PREPARATION METHOD FOR W-Cu COMPOSITE PLATE WITH Cu PHASE IN FINGER-SHAPED GRADIENT DISTRIBUTION

(71) Applicant: HEFEI UNIVERSITY OF TECHNOLOGY, Hefei (CN)

(72) Inventors: Jigui Cheng, Hefei (CN); Rui Zhou, Hefei (CN); Bangzheng Wei, Hefei (CN); Pengqi Chen, Hefei (CN); Su Zheng, Hefei (CN); Xinxi Yu, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 389 days.

(21) Appl. No.: 17/967,906

(22) Filed: Oct. 18, 2022

(65) Prior Publication Data
US 2023/0117192 A1   Apr. 20, 2023

(30) Foreign Application Priority Data

Oct. 18, 2021 (CN) .......................... 202111209149.7

(51) Int. Cl.
*C22C 1/05*   (2023.01)
*B22F 1/102*   (2022.01)
(Continued)

(52) U.S. Cl.
CPC .............. *C22C 1/058* (2013.01); *B22F 1/102* (2022.01); *B22F 3/1021* (2013.01);
(Continued)

(58) Field of Classification Search
CPC ......... C22C 1/058; C22C 27/04; B22F 1/102; B22F 3/1021; B22F 3/1121; B22F 3/22;
(Continued)

(56) References Cited

U.S. PATENT DOCUMENTS

2017/0368607 A1   12/2017   Parvin et al.

FOREIGN PATENT DOCUMENTS

| CN | 1593818 A | 3/2005 |
| CN | 103317140 A | 9/2013 |

(Continued)

*Primary Examiner* — Ricardo D Morales
(74) *Attorney, Agent, or Firm* — Bayramoglu Law Offices LLC

(57) ABSTRACT

A preparation method for a W—Cu composite plate with a Cu phase in finger-shaped gradient distribution is provided. The method includes adding $WO_X$ powder obtained with ammonium metatungstate as a raw material into W powder through a combustion synthesis method, adding a binder and a pore-forming agent to prepare a slurry, then performing tape casting, soaking in water and sintering to obtain a W framework with pores in finger-shaped distribution, and then infiltrating Cu to obtain a target product. The Cu phase in the W—Cu composite material prepared by the present method is distributed in a finger-shaped gradient manner from an infiltration surface to the interior of a specimen, the Cu phase and the W phase are mutually pinned, and the W—Cu interface has good bonding strength. The present method has the characteristics of adjustable material component performance, simple process, low cost, suitability for large-scale production and the like.

8 Claims, 3 Drawing Sheets

(51) Int. Cl.
*B22F 3/10* (2006.01)
*B22F 3/11* (2006.01)
*B22F 3/22* (2006.01)
*B22F 3/26* (2006.01)
*B22F 5/00* (2006.01)
*B22F 9/04* (2006.01)
*C01G 41/02* (2006.01)
*C22C 27/04* (2006.01)

(52) U.S. Cl.
CPC .............. *B22F 3/1121* (2013.01); *B22F 3/22* (2013.01); *B22F 3/26* (2013.01); *B22F 5/006* (2013.01); *C01G 41/02* (2013.01); *C22C 27/04* (2013.01); *B22F 9/04* (2013.01); *B22F 2009/043* (2013.01); *B22F 2301/10* (2013.01); *B22F 2301/20* (2013.01)

(58) Field of Classification Search
CPC .... B22F 3/26; B22F 5/006; B22F 9/04; B22F 2009/043; B22F 2301/10; B22F 2301/20; C01G 41/02
See application file for complete search history.

(56) References Cited

FOREIGN PATENT DOCUMENTS

| | | | |
|---|---|---|---|
| CN | 109702200 | A | 5/2019 |
| CN | 110434343 | A | 11/2019 |
| CN | 110964939 | A | 4/2020 |
| CN | 110976889 | A | 4/2020 |
| JP | H10258479 | A | 9/1998 |

PREPARATION METHOD FOR W-Cu COMPOSITE PLATE WITH Cu PHASE IN FINGER-SHAPED GRADIENT DISTRIBUTION

CROSS REFERENCE TO THE RELATED APPLICATIONS

This application is based upon and claims priority to Chinese Patent Application No. 202111209149.7, filed on Oct. 18, 2021, the entire contents of which are incorporated herein by reference.

TECHNICAL FIELD

The present invention relates to a preparation method for a W—Cu composite plate with a Cu phase in finger-shaped gradient distribution, and belongs to the field of the preparation of metal matrix composites.

BACKGROUND

The functionally graded material (FGM) is a novel heterogeneous composite material with non-uniform changes in material compositions and gradient changes in performance, which is obtained by continuously changing the structures, compositions, density and the like of two or more materials with different properties to reduce or even eliminate the internal interface. The research of the FGM comprises material design, material synthesis (preparation) and material property evaluation. These three parts are complementary and indispensable, the core part of which is material preparation.

The W—Cu FGM combines the good electric conductivity, heat conductivity and corrosion resistance of Cu and the high hardness, strength and thermal stability of W, and is gradually transited from a high W (pure W) layer to a high Cu (pure Cu) layer along the section, so that the W—Cu FGM has various excellent performance and has good application prospects in electronic packaging and aerospace. However, since the W and Cu have largely different melting points and are not mutually soluble, the process for preparing the high-density W—Cu FGM by the powder metallurgy process is difficult and the gradient component distribution is difficult to control effectively. At present, the W—Cu gradient material is mostly prepared by a lamination method, the obtained W—Cu gradient composite material is mostly of a layered structure, and there is still an obvious interface between the layers. This interface is prone to cracking and other phenomena at the interface due to the thermal expansion difference between layers under extreme working environments, thereby affecting the service life of the W—Cu gradient material. The W—Cu layered gradient composite material designed by M. Richou et al. cracked after 972 thermal cycles (M. Richou, F. Gallay, B. Boswirth, et al. *Fusion Engineering and Design*, 2020, 157. 111610). Wei Bangzheng et al, prepared a slurry with W powders of different particle sizes as raw materials, polyvinyl butyral (PVB) as a binder and absolute ethanol as a solvent, then obtained a W framework with pores in continuous gradient distribution through sedimentation, degumming and pre-sintering, and then infiltrating Cu into the W framework to obtain a W—Cu functionally graded material with Cu content ranging from 28.03% to 44.47% (Wei B Z, Yu X X, Chen R Z, et al. A Novel Approach to Fabricate W—Cu Functionally Graded Materials via Sedimentation and Infiltration Method[J]. *Materials Science and Engineering: A*, 2021). Jiang Dafa et al. compared the bonding strength between W and Cu among four interfaces: the original interface, the nano-ripple interface, the microcube interface and the micropit interface, and concluded that W, Cu micropit interfaces comprehensively improved the tensile strength, the shear strength, the heat transfer capacity, the thermal stress resistance and the thermal fatigue life of the W, Cu joints (Jiang D, Long J, Han J, et al. *Materials Science and Engineering: A*, 2017, 696 (June 1): 429-436).

In conclusion, the W—Cu gradient composite materials are mostly prepared in layered structures at present, and there are fewer researches on the W—Cu gradient composite material with the Cu phase in finger-shaped gradient distribution.

SUMMARY

An objective of the present invention is to provide a preparation method for a W—Cu composite plate with a Cu phase in finger-shaped gradient distribution, which comprises firstly preparing a W framework with finger-shaped pore distribution, then placing a purple Cu block or a Cu powder pressed compact on a surface of the W framework with finger-shaped pores in an infiltration sintering furnace under the protection of $N_2$ or $H_2$ atmosphere, performing heating to melt Cu, infiltrating the Cu melt into the finger-shaped pores of the W framework under the action of capillary force, and finally obtaining a composite plate with the Cu phase in finger-shaped gradient distribution from an infiltration surface to the interior of a specimen, wherein the Cu phase and the W phase are mutually pinned, and the W—Cu interface has good bonding strength.

In order to achieve the above objective, the present invention adopts the following technical solutions:
a preparation method for a W—Cu composite plate with a Cu phase in finger-shaped gradient distribution, comprising the following steps:
(1) mixing WOX powder and W powder to obtain a powder mixture; adding the powder mixture, a binder polyethersulfone and a pore-forming agent polyvinyl pyrrolidone into an N-methylpyrrolidone solvent, and uniformly mixing the mixture by ball milling in a planetary ball mill to obtain a slurry;
(2) tape-casting the slurry on a PET film to obtain a green body, soaking the obtained green body and the PET film in water together to partially remove the solvent N-methylpyrrolidone, then separating the green body from the PET film, and then drying the green body;
(3) pre-sintering the obtained green body at 500-800° C. under $H_2$ atmosphere to remove the binder and reduce the green body, and then performing heating to 800-2000° C. to sinter the green body to obtain a W framework with finger-shaped distributed pores; and
(4) infiltrating Cu into the W framework, and then cooling the framework along with the furnace to obtain the W—Cu composite plate with the Cu phase in finger-shaped gradient distribution.

Further, the $WO_X$ powder is obtained through a combustion synthesis method by taking ammonium metatungstate, ammonium nitrate, glycine and ethylenediaminetetraacetic acid as raw materials, adding deionized water for dispersion, and then placing the mixture into a muffle furnace at a constant temperature of 200° C. The purpose of using the $WO_X$ powder is to prevent carbon remaining in the material after binder removal and reduction from forming excess WC with W, thereby affecting the performance of the final material; the $WO_X$ powder is obtained by taking ammonium metatungstate as a raw material through a combustion synthesis method, has a special surface structure and highest chemical activity, and is suitable for the production of ultrafine particle tungsten powder and various nano-scale tungsten compounds.

Further, in the step (1), the $WO_X$ powder accounts for 0-50 wt. % of the mass of the powder mixture; the addition amounts of the polyethersulfone and the polyvinyl pyrrolidone each independently account for 1-6% of the mass of the powder mixture; and the slurry has a solid content of 50-85 wt. %.

Further, in the step (1), the ball milling is performed at a rotation speed of 100-400 r/min for 2-48 h.

Further, in the step (2), the green body obtained through tape-casting has a thickness of 200 μm-2 mm.

Further, in the step (2), when the obtained green body and the PET film are soaked in water together, the PET film is placed at the lower part, the green body is placed at the upper part, and the sample is ensured to be parallel to the horizontal plane, so that the pore distribution in the green body is controlled, and the soaking is performed for 12-48 h.

Further, in the step (2), when the obtained green body and the PET film are soaked in water together, the exchange of water and N-methylpyrrolidone occurs at the interface of an upper surface of the green body and water, and water penetrates into the green body, forming finger-shaped pores.

Further, in the step (3), the obtained green body is pre-sintered at 500-800° C. for 1-4 h and sintered at 800-2000° C. for 1-4 h, and the gradient component distribution in the final W—Cu composite plate is controlled by controlling the framework sintering temperature.

Further, in the step (4), the step of infiltrating Cu into the W framework is that a pure purple Cu block or an electrolytic Cu powder pressed compact is placed on the surface of the W framework with finger-shaped pores in an infiltration sintering furnace under the protection of $N_2$ or $H_2$ atmosphere, the heating is performed to melt Cu, the Cu melt is infiltrated into the finger-shaped pores of the W framework under the action of capillary force, and the infiltration of Cu is performed at 1200-1500° C. for 1-4 h.

The present invention has the following beneficial effects.

1. The Cu phase in the W—Cu composite material prepared by the method of the present invention is distributed in a finger-shaped gradient manner from an infiltration surface to the interior of a specimen, the Cu phase and the W phase are mutually pinned, and the W—Cu interface has good bonding strength; the method of the present invention has the characteristics of adjustable material component performance, simple process, low cost, suitability for large-scale production and the like.

2. According to the present invention, the $WO_X$ powder is prepared by taking ammonium metatungstate as a raw material through a combustion synthesis method, the raw material has low cost and is easy to obtain, and the obtained $WO_X$ powder has a special surface structure and the highest chemical activity, and is suitable for the production of ultrafine particle tungsten powder and various nano-scale tungsten compounds.

3. The W framework obtained by unidirectional water infiltration and then binder removal and pre-sintering has a special structure with finger-shaped pores.

4. The method of the present invention can control the gradient distribution by controlling the solid content and thus the size of the finger-shaped pores: when the solid content is smaller, the diffusion speed of the solution is higher, the formed new pores have a large number and small size, and the formed pore structure is spongy at this time; when the solid content is larger, the diffusion speed of the solution is slower, the formed new pores continuously grow, and the formed pore structure is finger-shaped.

5. In the method of the present invention, the W framework with finger-shaped pore distribution is obtained by removing the binder and reducing the binder, the finger-shaped pores are gradually increased in size, the fine-grained W powder has better sintering activity and can be compacted at a lower temperature, so the pore distribution range in the W framework can be enlarged by controlling the sintering process, a gradient material transiting from a pure W layer to a W—Cu layer can be obtained, and the working stability of the material at a high temperature is met.

DETAILED DESCRIPTION OF THE EMBODIMENTS

The following examples are described in detail with reference to the accompanying drawings, and the following examples are implemented on the premise of the technical solution of the present invention, and give detailed embodiments and specific operation procedures. However, the protection scope of the present invention is not limited to the following examples.

Example 1

Figure 1:
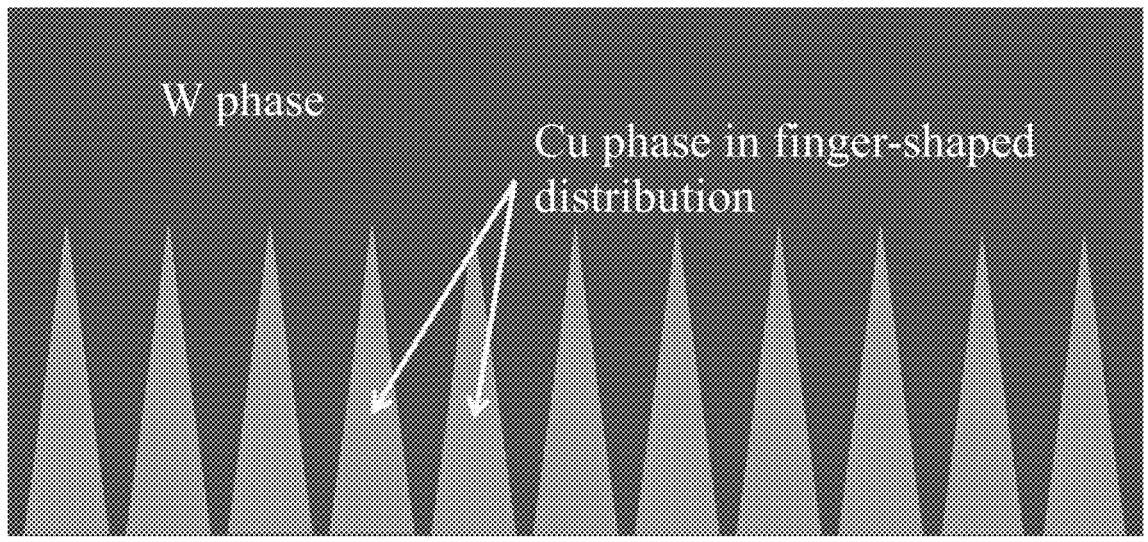
FIG. 1 is a schematic structural diagram of a W—Cu composite plate with a Cu phase in finger-shaped gradient distribution.
Figure 2:
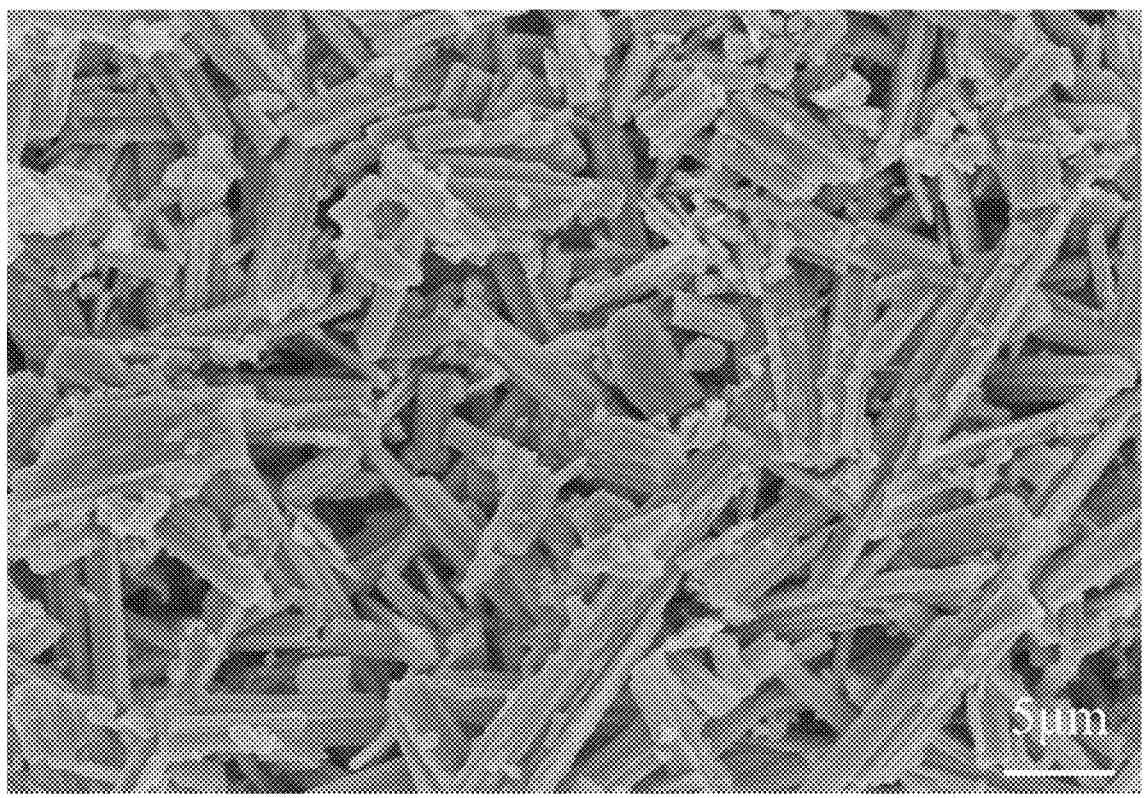
FIG. 2 is an SEM photograph of the $WO_X$ powder obtained in Example 1.

(1) Ammonium metatungstate, ammonium nitrate, glycine and ethylenediaminetetraacetic acid were mixed and added with deionized water for dispersion, and then the mixture was placed into a muffle furnace at a constant temperature of 200° C. for 2 h under the air atmosphere to obtain $WO_X$ powder; wherein the mass ratio of ammonium metatungstate, ammonium nitrate, glycine, ethylenediaminetetraacetic acid and deionized water is 12:19.2:7:0.7:50. FIG. 2 is an SEM photograph of the obtained $WO_X$ powder, and it can be seen that the obtained powder is in short rod-shaped and has a diameter of 0.5 to 2 μm and a length of 2 to 10 μm.

50 g of the $WO_X$ powder, 100 g of 0.8 μm W powder, 4 g of polyethersulfone, 2.67 g of polyvinyl pyrrolidone and 26.7 g of N-methylpyrrolidone were weighed and added into a ball milling tank for ball milling for 12 h at a ball-material ratio of 1:5 and a rotating speed of 400 r/min to obtain a slurry with the solid content of 82%.

(2) The obtained slurry was tape-casted on a PET film to obtain a green body with a thickness of 2 mm, and the obtained green body and the PET film were soaked in water together to partially remove the solvent N-methylpyrrolidone, wherein the PET film was placed at the lower part, the green body was placed at the upper part, and the sample was ensured to be parallel to the horizontal plane so as to control the pore distribution in the green body, the soaking was performed for 24 h, the exchange of water and N-methylpyrrolidone occurs at the interface of an upper surface of the green body and water, and water penetrates into the green body, forming finger-shaped pores.

After the soaking was completed, the green body was separated from the PET film and then dried.

Figure 3:
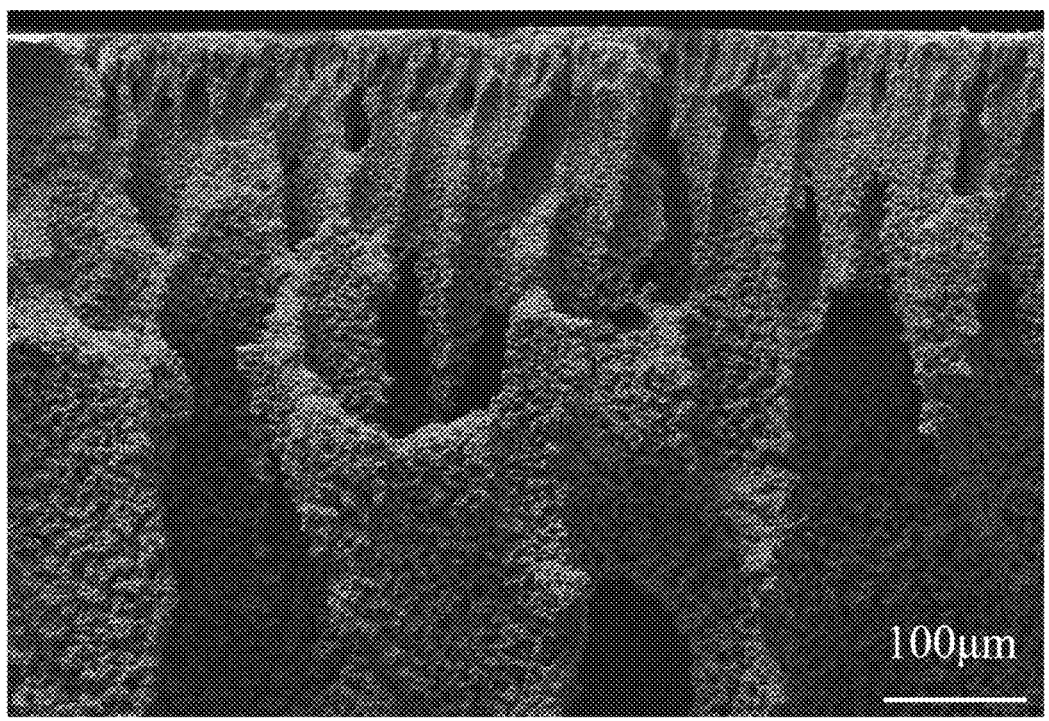
FIG. 3 is an SEM photograph of the W framework obtained in Example 1.

(3) The obtained green body was pre-sintered at 500° C. for 4 h under $H_2$ atmosphere to remove the binder and reduce the green body, and then the green body was heated to 800° C. and sintered for 2 h to obtain a W framework with finger-shaped distributed pores. FIG. 3 is an SEM photograph of the obtained W framework, and it can be seen that the finger-shaped pores are increased in size from top to bottom.

(4) A pure purple Cu block was placed on the surface of the W framework with finger-shaped pores in an infiltration sintering furnace under the protection of $N_2$ atmosphere and heated to melt Cu, the Cu melt was infiltrated into the finger-shaped pores of the W framework under the action of capillary force, and the infiltration of Cu was performed at 1300° C. for 2 h.

Figure 4:
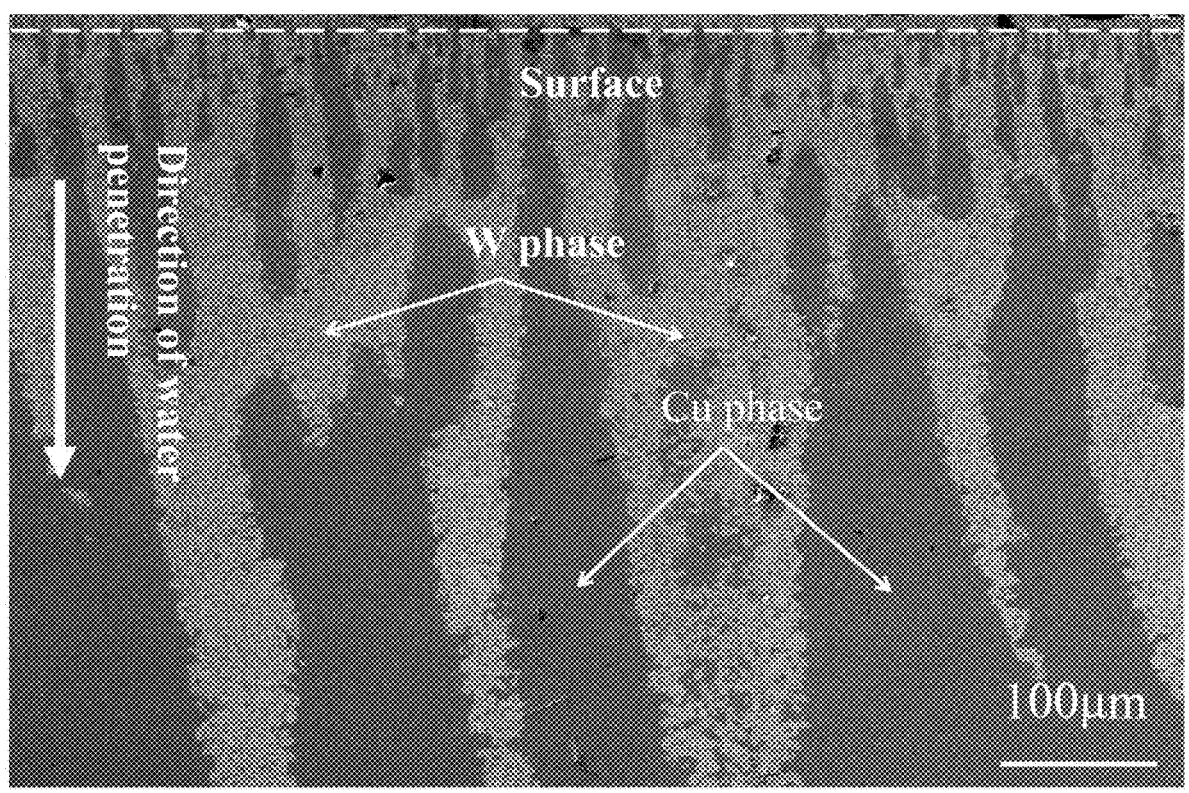
FIG. 4 is an SEM photograph of the W—Cu composite plate obtained in Example 1.

FIG. 4 is an SEM photograph of the W—Cu composite plate obtained in the Example, and it can be seen that the Cu phase is distributed in a finger-shaped gradient, and the gradient is gradually increased from top to bottom.

Figure 5:
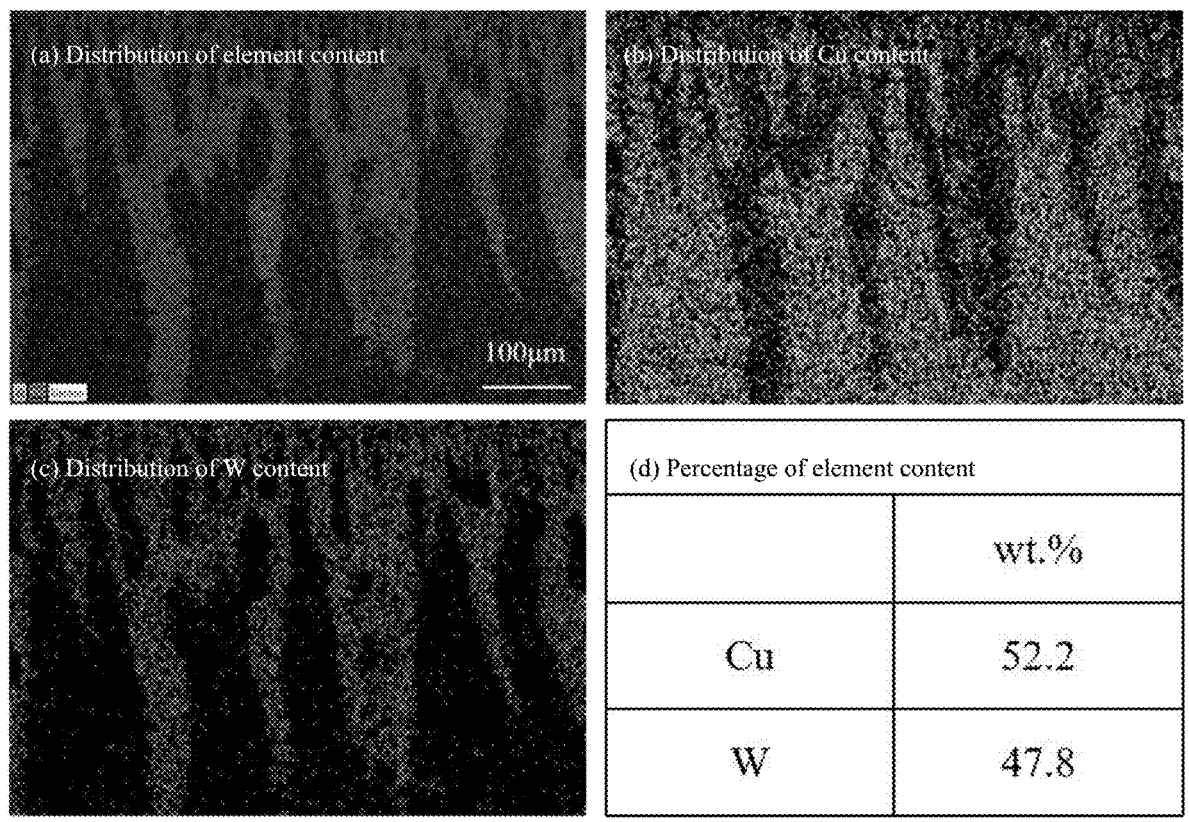
FIG. 5 shows the EDS pattern and content distribution of the W—Cu composite panel obtained in Example 1.

FIG. 5 shows the EDS pattern and content distribution of the W—Cu composite plate obtained in the Example, and it can be seen that the W phase and the Cu phase are well bonded to each other.

The above mentioned contents are only exemplary examples of the present invention and are not intended to limit the present invention. Any modification, equivalent substitution, improvement and the like made within the spirit and principle of the present invention shall all fall within the scope of protection of the present invention.

What is claimed is:

1. A preparation method for a W—Cu composite plate with a Cu phase in a finger-shaped gradient distribution, comprising the following steps:
   (1) mixing a $WO_X$ powder and a W powder to obtain a powder mixture; adding the powder mixture, a binder polyethersulfone, and a pore-forming agent polyvinyl pyrrolidone into an N-methylpyrrolidone solvent to obtain a first resulting mixture, and uniformly mixing the first resulting mixture by a ball milling in a planetary ball mill to obtain a slurry;
   wherein the $WO_X$ powder accounts for 50 wt. % or less of a mass of the powder mixture and is not 0; the binder polyethersulfone and the pore-forming agent polyvinyl pyrrolidone each independently account for 1-6% of the mass of the powder mixture; and the slurry has a solid content of 50-85 wt. %;
   (2) tape-casting the slurry on a PET film to obtain a green body, soaking the green body and the PET film in water together to partially remove the N-methylpyrrolidone solvent, then separating the green body from the PET film, and then drying the green body;
   (3) pre-sintering the green body at 500-800° C. under a $H_2$ atmosphere to remove the binder polyethersulfone and reduce the green body, and then performing a heating to 800-2000° C. to sinter the green body to obtain a W framework with finger-shaped distributed pores; and
   (4) infiltrating Cu into the W framework to obtain a resulting framework, and then cooling the resulting framework along with a furnace to obtain the W—Cu composite plate with the Cu phase in the finger-shaped gradient distribution.

2. The preparation method for the W—Cu composite plate with the Cu phase in the finger-shaped gradient distribution according to claim 1, wherein the $WO_X$ powder is obtained through a combustion synthesis method by taking ammonium metatungstate, ammonium nitrate, glycine, and ethylenediaminetetraacetic acid as raw materials, adding deionized water for a dispersion to obtain a second resulting mixture, and then placing the second resulting mixture into a muffle furnace at a constant temperature of 200° C.

3. The preparation method for the W—Cu composite plate with the Cu phase in the finger-shaped gradient distribution according to claim 1, wherein in the step (1), the ball milling is performed at a rotation speed of 100-400 r/min for 2-48 h.

4. The preparation method for the W—Cu composite plate with the Cu phase in the finger-shaped gradient distribution according to claim 1, wherein in the step (2), the green body obtained through the tape-casting has a thickness of 200 μm-2 mm.

5. The preparation method for the W—Cu composite plate with the Cu phase in the finger-shaped gradient distribution according to claim 1, wherein in the step (2), when the green body and the PET film are soaked in the water together, the PET film is placed at a lower part, the green body is placed at an upper part, and a sample is ensured to be parallel to a horizontal plane, so that a pore distribution in the green body is controlled, and the soaking is performed for 12-48 h.

6. The preparation method for the W—Cu composite plate with the Cu phase in the finger-shaped gradient distribution according to claim 1, wherein in the step (2), when the green body and the PET film are soaked in the water together, an exchange of the water and the N-methylpyrrolidone solvent occurs at an interface of an upper surface of the green body and the water, and the water penetrates into the green body, forming finger-shaped distributed pores.

7. The preparation method for the W—Cu composite plate with the Cu phase in the finger-shaped gradient distribution according to claim 1, wherein in the step (3), the green body is pre-sintered at 500-800° C. for 1-4 h and sintered at 800-2000° C. for 1-4 h.

8. The preparation method for the W—Cu composite plate with the Cu phase in the finger-shaped gradient distribution according to claim 1, wherein in the step (4), the step of infiltrating the Cu into the W framework is that a pure purple Cu block or an electrolytic Cu powder pressed compact is placed on a surface of the W framework with the finger-shaped distributed pores in an infiltration sintering furnace under a protection of a $N_2$ or $H_2$ atmosphere, the heating is performed to melt the Cu to obtain a Cu melt, the Cu melt is infiltrated into the finger-shaped distributed pores of the W framework under an action of a capillary force, and an infiltration of the Cu is performed at 1200-1500° C. for 1-4 h.

* * * * *